Dec. 22, 1931.　　　　G. W. DELHAYE　　　　1,837,809
FOOT MEASURING DEVICE
Filed May 26, 1930
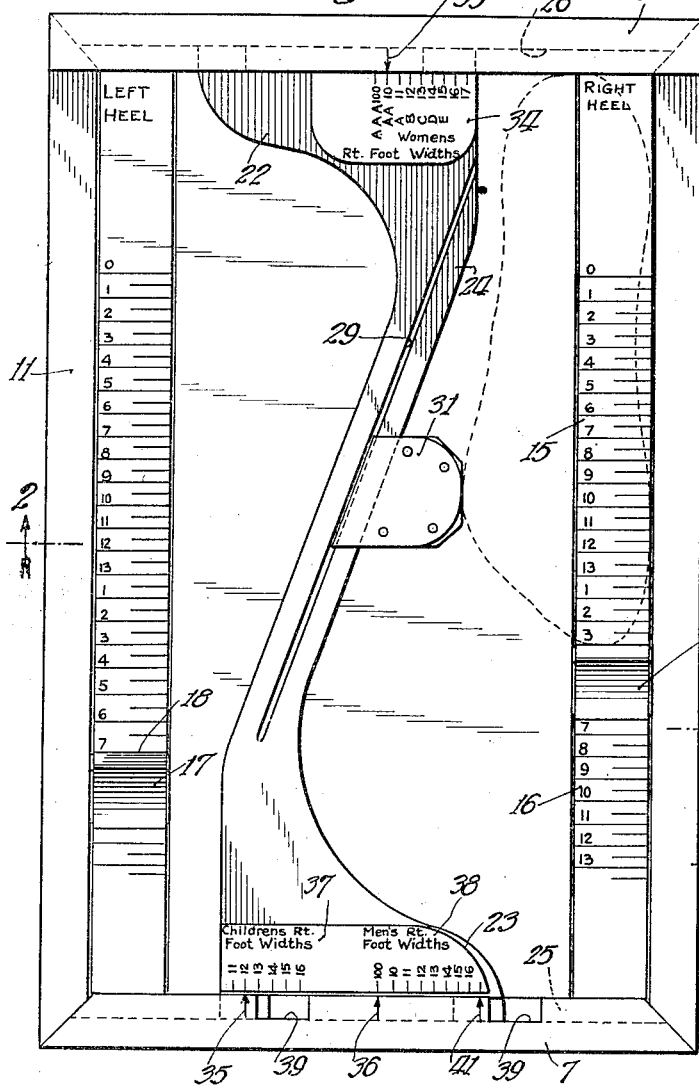
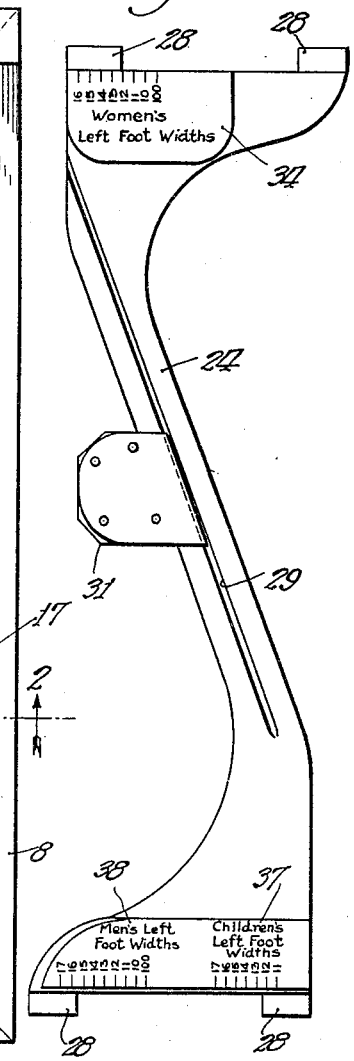
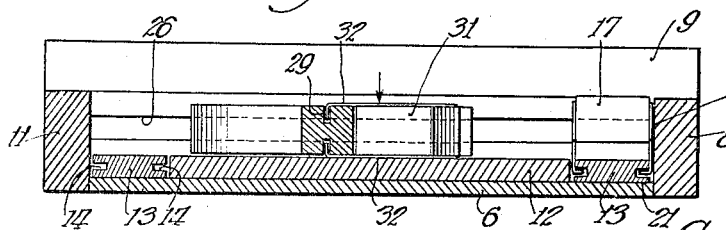
Inventor
George W. Delhaye
By George E. Mueller Atty.

Patented Dec. 22, 1931

1,837,809

UNITED STATES PATENT OFFICE

GEORGE W. DELHAYE, OF HIGHLAND PARK, ILLINOIS

FOOT MEASURING DEVICE

Application filed May 26, 1930. Serial No. 455,560.

My invention relates to a foot measuring device and more particularly to a device for measuring the length as well as the width of a foot relative to the length.

In measuring a foot to determine the size of a shoe required, the numerical size is determined wholly by measuring the length of the foot. However, the numerical width of a foot is not determined by the absolute width, but by the width relative to the length. For this reason two feet of the same absolute width may call for different numerical widths of shoes if the feet differ in length.

An object of my invention is to provide a new and improved foot measuring device.

A further object is to provide a device for indicating directly the length and width of a foot.

A further object is to provide a device for measuring a foot, which is simple to operate and requires no mental calculations to determine the size of a foot.

Other objects and advantages will appear as the description proceeds.

Referring to the drawings:

Fig. 1 is a plan view of a device embodying my invention,

Fig. 2 is a cross-sectional view taken on line 2—2 of Fig. 1, and,

Fig. 3 is a detail view of a portion of the device shown in Fig. 1 in an inverted position.

The device is mounted on a base 6, which is surrounded by frame members 7, 8, 9, and 11. The heel of the foot to be measured is placed against the frame member 9, and this member is therefore made somewhat higher than the remaining sides. Mounted upon the base 6 is an upper base member 12, which extends longitudinally the full length of the frame, but is narrower than the base 6, leaving a longitudinal space at each side thereof. In these longitudinal spaces ferrules 13, of the same thickness as base member 12, are mounted, and each ferrule is provided with grooves 14 in the opposite edges thereof. Each of the ferrules is provided with scales 15 and 16 which are calibrated to indicate the size of shoe required for a particular length of foot. Cooperating with the ferrules are slide members 17 which have a flat face 18 and are provided along their sides with plates 19 whose lower edges are turned inwardly forming flanges 21, which engage the grooves 14. Thus, when a foot is placed upon the device, the slide member is moved forwardly on the ferrule until it engages the end of the foot, and the length of the foot is then read from the scale by the position of the slide member 17. The ferrule on the left side of the device measures the length of the left foot, and the ferrule on the right side of the device measures the length of the right foot.

In order to measure the width of a foot the device is provided with a laterally adjustable member comprising sliding blocks 22 and 23 connected by an obliquely or diagonally extending arm 24. The frame members 7 and 9 are provided with grooves 25 and 26, and the sliding blocks are provided with tongues 28 engaging the grooves and allowing the member to be adjusted laterally. The oblique arm 24 is provided with grooves 29, and an obliquely movable member 31 is longitudinally adjustable along the arm 24, and is provided with plates 32 having flanges engaging the grooves 29. The frame member 9 is provided with an indicating arrow 33 which cooperates with a scale 34 on sliding block 32 to indicate the width of women's feet. The frame member 7 is provided with arrows 35 and 36 cooperating with the scales 37 and 38 to indicate the width of children's and men's feet respectively.

Assuming that it is desired to measure the right foot of a person, the heel of the right foot is placed against the frame member 9, and the inner side of the foot is placed against the frame member 8. The slide member 17 is then moved to engage the end of the foot and indicate the length of the foot. To determine the width of a foot sliding member 31 is adjusted to a longitudinal position corresponding to the widest part of the foot. After being adjusted longitudinally, the member 31 is moved into engagement with the foot, causing the laterally adjustable member to move correspondingly. If the foot being measured is a woman's foot, the relative width is read from scale 34; or if the foot being measured is a child's or man's foot, the width is read from scale 37 or 38 respectively. It will be seen that on account of the movement of sliding member 31 the same foot may give different measurements of width depending upon the length of the foot.

If it is desired to measure the left foot instead of the right foot, the left foot is placed with its heel against frame member 9, and the inner side of the foot against frame member 11. The length of the foot is then determined from the scales on the left side of the device. In order to measure the width of the left foot, the laterally adjustable member is inverted as shown in Fig. 3. This member may be inverted by moving the member laterally until tongues 28 coincide with notches 39 in frame member 7. This allows the sliding block 23 to be lifted free from the frame member 7, whereupon the entire member may be removed from the base and inverted, and then replaced upon the base in the inverted position. The width of the left foot is then determined in the same manner as described in connection with determining the width of the right foot. Both sides of the laterally adjustable member are provided with similar scales. The scales for measuring the width of women's and men's feet are centrally located, and therefore the widths are indicated by the arrows 33 and 36 in either position of the member. The scale 37 for children's feet being located to one side, a second arrow 41 is marked upon the frame member 7 to indicate the width of children's feet when the left foot is being measured. By means of the device of the invention it is possible to read the relative widths of feet being measured directly, without making any mental calculations, resulting in accurate measurements without loss of time.

It will be understood that the nature and embodiments of the invention herein described and disclosed are merely illustrative and that many changes and modifications may be made therein without departing from the spirit and scope of the invention, which is to be limited only in accordance with the following claims.

What I claim is new and desire to protect by Letters Patent of the United States is:—

1. In a foot measuring device, a base, means movable longitudinally of the base for measuring the length of the foot, a laterally movable member, means obliquely movable upon said laterally movable member, said laterally and obliquely movable members cooperating to measure the width of the foot.

2. In a foot measuring device, a base, a member movable longitudinally of the base, said base having a scale for indicating the length of the foot, means laterally movable upon said base, means obliquely movable upon said laterally movable means, said base having a scale cooperating with said laterally movable means for indicating the width of the foot.

3. In a foot measuring device, means for measuring the width of a foot relative to its length comprising a laterally adjustable member, means movable with said laterally movable member and longitudinally movable thereon at an oblique angle, and a scale cooperating with said laterally movable member for directly indicating the width.

4. In a foot measuring device, a base provided with a surrounding rectangular frame, the ends of the frame being provided with grooves, a laterally movable member on said base, said member having tongues engaging said grooves to retain said member on the base, and a member movable obliquely on said laterally movable member.

5. In a foot measuring device, a base, means for measuring the length of one foot at one side thereof, means for measuring the length of the other foot at the other side thereof, an intermediate laterally movable member for measuring the width of the foot, said member being invertible to measure the width of either foot.

6. In a foot measuring device, means for measuring the length of each foot, a laterally movable member, a longitudinally movable member secured to the laterally movable member and cooperating therewith to directly indicate the width of a foot relative to its length, said longitudinally and laterally movable members being invertible to indicate the width of either foot.

7. In a foot measuring device, a base member, ferrules at the opposite sides of the base member, a sliding member cooperating with each ferrule to indicate the length of the foot, a laterally adjustable member, a member diagonally adjustable thereon, and a plurality of scales carried by the laterally adjustable member for indicating the relative widths of different types of feet.

In witness whereof, I hereunto subscribe my name this 21st day of May, 1930.

GEORGE W. DELHAYE.